United States Patent [19]

White

[11] Patent Number: 4,823,597
[45] Date of Patent: Apr. 25, 1989

[54] SLIVER MEASURING APPARATUS

[75] Inventor: Homer S. White, Durham, N.C.

[73] Assignee: Myrick-White, Inc., Durham, N.C.

[21] Appl. No.: 202,257

[22] Filed: Jun. 6, 1988

[51] Int. Cl.⁴ .............................................. G01L 5/04
[52] U.S. Cl. ...................................... 73/160; 73/159; 248/636; 248/562; 19/157
[58] Field of Search .................. 73/159, 160; 248/636, 248/562, 560; 19/0.23, 157, 144

[56] References Cited

U.S. PATENT DOCUMENTS

| | | | |
|---|---|---|---|
| 2,878,528 | 3/1959 | Selby | 19/157 |
| 2,964,272 | 12/1960 | Olson | 248/638 |
| 3,133,320 | 5/1964 | Swanson | 19/157 |
| 3,552,694 | 1/1971 | Flannelly | 248/562 |
| 3,822,590 | 7/1974 | Tharpe et al. | 73/160 |
| 3,854,330 | 12/1974 | Wildbolz | 73/160 |
| 4,302,968 | 1/1981 | Moser | 73/160 |
| 4,318,299 | 3/1982 | Morf | 73/160 |
| 4,643,385 | 2/1987 | Sandercock | 248/636 |
| 4,766,647 | 8/1988 | Ackermann, Jr. et al. | 73/160 |

FOREIGN PATENT DOCUMENTS 3215182 4/1983 Fed. Rep. of Germany ........ 73/160

Primary Examiner—William A. Cuchlinski, Jr.
Assistant Examiner—Scott Alyea
Attorney, Agent, or Firm—Olive & Olive

[57] ABSTRACT

An improved measuring device for measuring the unit weight of sliver as it passes through a trumpet includes a trumpet gauge plate for supporting the trumpet and a pair of weighted elements mounted on each side of the plate. The plate includes upper, lower and central portions wherein the lower portion includes an opening for supporting the trumpet and the central portion has a reduced cross section. A plurality of strain gauges for detecting deflections is mounted on front and rear surfaces of the central portions adjacent the lower portion and the weighted elements. The strain gauges are electrically connected in a modified Wheatstone Bridge configuration. Deflection sensings in strain gauges adjacent the weighted elements cancel out deflection sensings produced by external vibrations to produce an accurate measurement of the sliver weight.

6 Claims, 6 Drawing Sheets

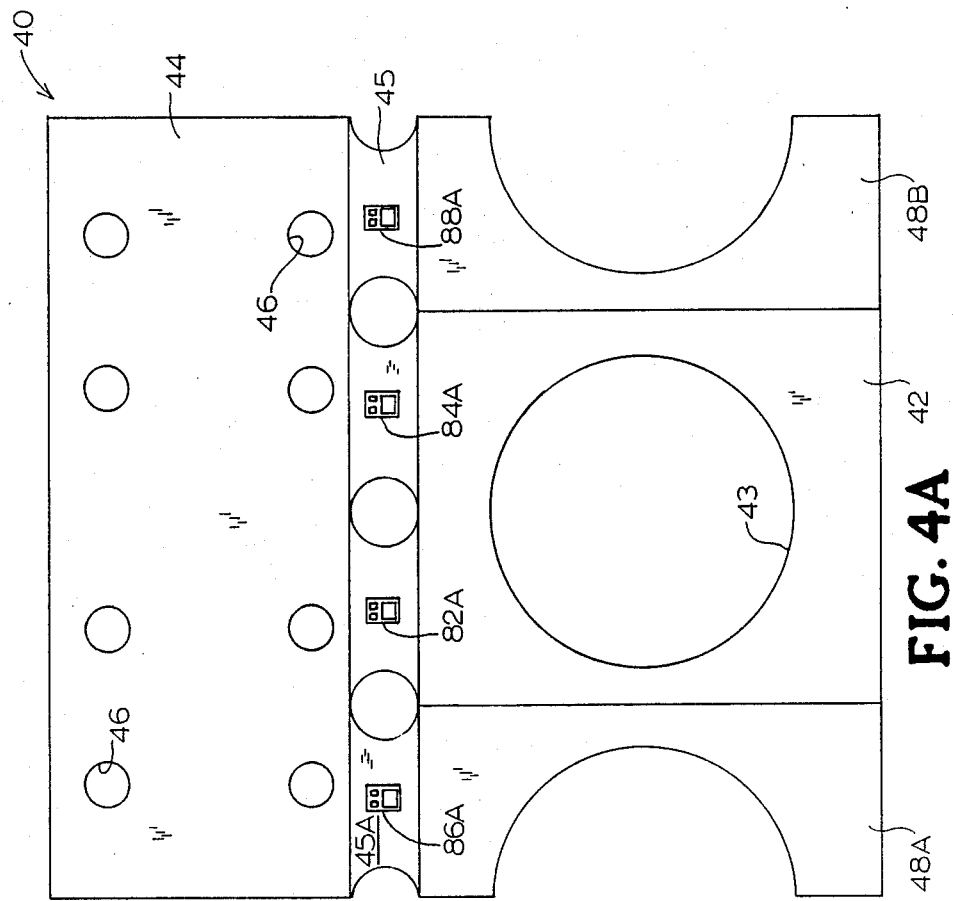
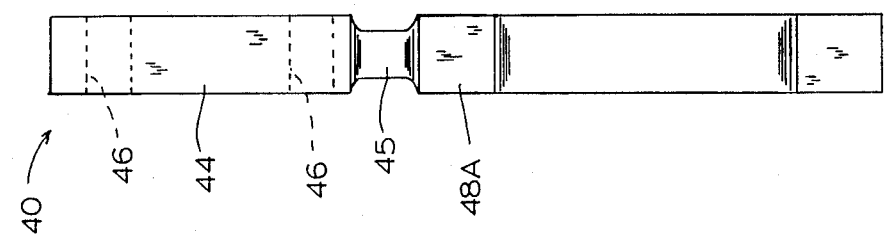
FIG. 4A
FIG. 4B 4,823,597

SLIVER MEASURING APPARATUS

BACKGROUND OF THE INVENTION

1. Field of the Invention

The present invention relates generally to measuring devices, and in particular, is concerned with a measuring apparatus for determining the weight of sliver.

2. Description of the Related Art

In the textile industry, loose, untwisted fibers, such as cotton, worsted or wool, are manipulated during a carding process to form sliver. Sliver is generally coiled into and stored in cans or drums prior to spinning or other processes before being made into yarn.

For a carding process, it is desirable to know the weight per unit length of the sliver. Conventionally, this value has been determined by the use of strain gauges. Prior to carding, the sliver is passed through a funnel, commonly known as a trumpet, which is mounted on and supported by a rigid plate, e.g. a steel plate. Strain gauges mounted on the plate sense deflections caused by the sliver. The deflection sensings are translated into unit weight measurements by wiring the strain gauges in a well-known Wheatstone Bridge configuration.

A particular problem with the above-described measuring technique is that the plate is subject to external vibrations and other deflections which cause inaccurate measurements. For example, heavy equipment traveling near the measuring apparatus can impart vibrations to the plate which are sensed by the strain gauges and result in erroneous measurements.

Consequently, a need exists for improvements in measuring devices for sliver. It is desirable that an improved measuring apparatus be capable of measurements free of error caused by external vibrations. Furthermore, it is desirable that an improved measuring apparatus be adaptable with existing trumpets and carding machines, and be easy to install and economical to operate.

SUMMARY OF THE INVENTION

An improved measuring device for measuring the unit weight of sliver as it passes through a trumpet includes a trumpet gauge plate for supporting the trumpet and a pair of weighted elements mounted on each side of the plate. The plate includes upper, lower and central portions wherein the lower portion includes an opening for supporting the trumpet and the central portion has a reduced cross section. A plurality of strain gauges for detecting deflections is mounted on front and rear surfaces of the central portion adjacent the lower portion and the weighted elements. The strain gauges are electrically connected in a modified Wheatstone Bridge configuration. Deflection sensings in strain gauges adjacent the weighted elements cancel out deflection sensings produced by external vibrations to produce an accurate measurement of the sliver weight.

BRIEF DESCRIPTION OF THE DRAWINGS

FIG. 4A is a side elevational view of a first embodiment of a trumpet gage plate of the present invention.

FIG. 4B is an end view of the apparatus of FIG. 4A.

DETAILED DESCRIPTION OF THE PREFERRED EMBODIMENTS

Figures 1A, 1B:
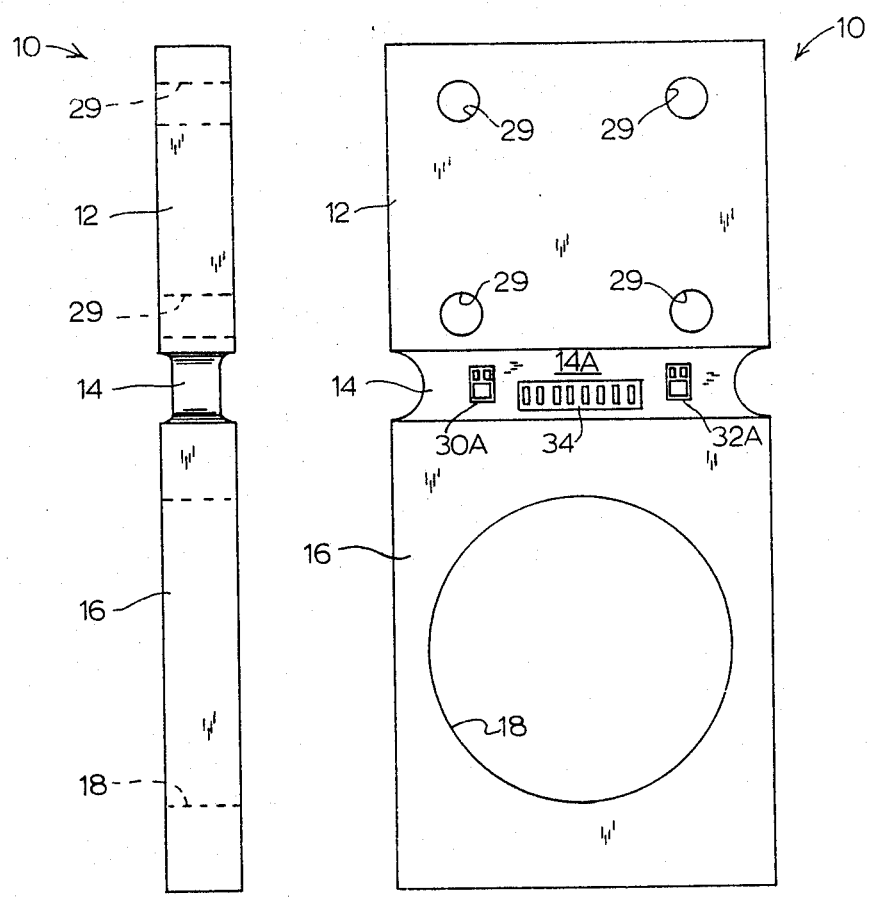
FIG. 1A is a side elevational view of a prior art trumpet gauge plate.
FIG. 1B is an end view of the apparatus of FIG. 1A.

A conventional trumpet gauge plate, indicated generally at 10, is illustrated in FIGS. 1A & 1B. Plate 10 is a vertically-positioned planar member having an upper portion 12, a central portion 14 and a lower portion 16. As illustrated best in FIG. 1A, central portion 14 has a cross section less than that of the upper portion 12 and lower portion 16. It is preferred that the cross sections of the upper portion 12 and the lower portion 16 be substantially the same.

Figure 2:
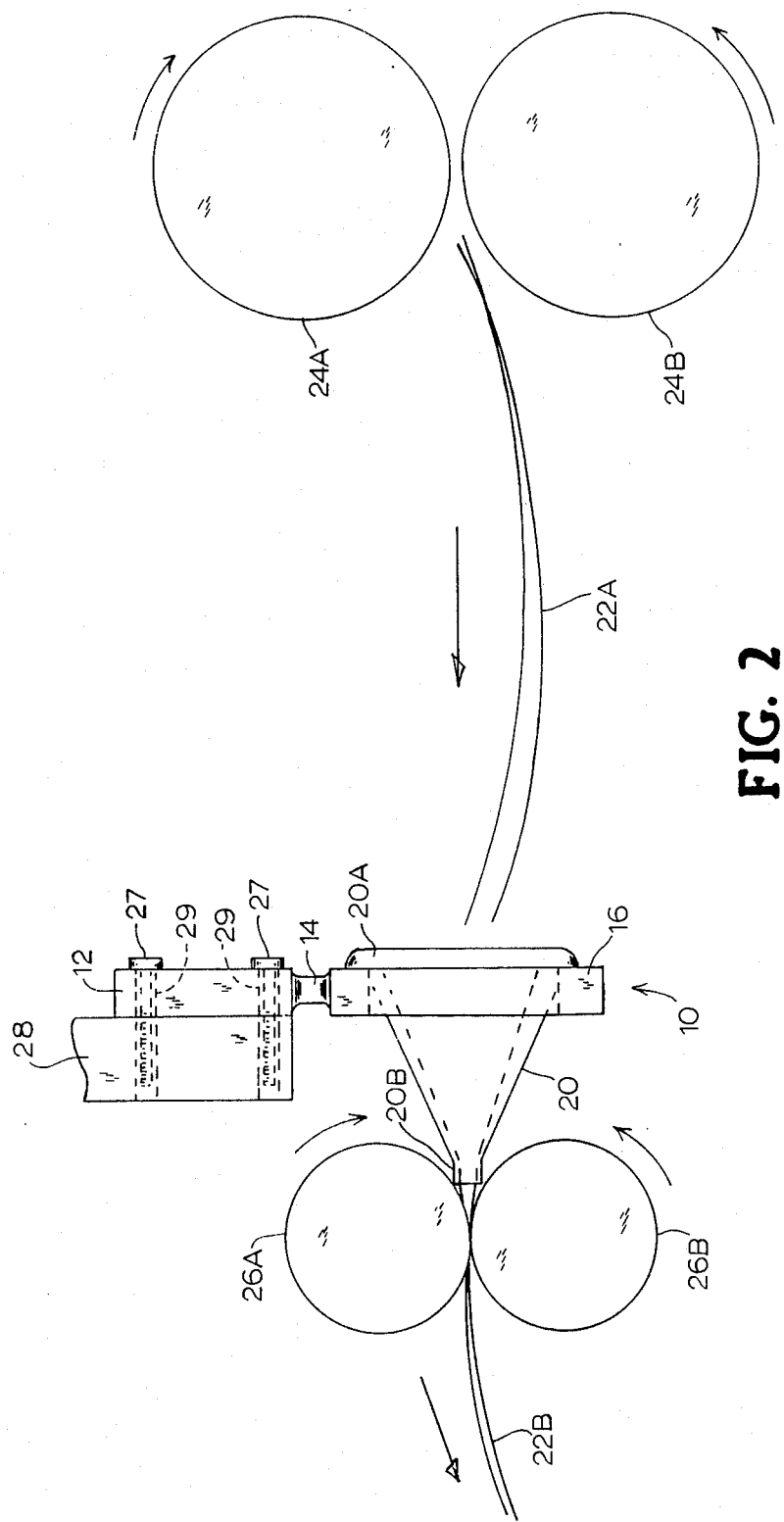
FIG. 2 is a schematic view of a sliver measuring apparatus illustrating a trumpet mounted on a trumpet gauge plate as sliver i drawn through the trumpet.

Lower portion 16 includes a central opening 18 for receiving a conical funnel or trumpet 20 as illustrated in FIG. 2. Trumpet 20 is secured by any suitable means to lower portion 16.

Textile material in the form of a thin planar web 22A is removed from the doffer roll (not shown) by doffer take-off rolls 24A, 24B. The web is condensed into a circular form 22B known as sliver as it is drawn through the mouth 20A and outlet 20B of trumpet 20 by calendar rolls 26A, 26B. Plate 10 is mounted to and supported by a base 28, e.g. a carding machine, by mechanical fasteners 27 passing through mounting openings 29 in the upper portion of plate 10.

Strain gauges are mounted on a front surface 14A of the central portion 14 of plate 10 to measure deflections in the plate 10 caused by the sliver 22 as it passes through trumpet 20. Typically, two strain gauges 30A and 32A are mounted to a front surface 14A of central portion 14 and two strain gauges 30B and 32B (not illustrated) are mounted to the rear surface 14B (not illustrated) of central portion 14. All strain gauges are connected to a terminal strip 34. Strain gauges 30A, 30B, 32A, 32B and terminal strip 34 are very thin, planar members. For purposes of clarity of illustration, strain gauges 30A, 30B, 32A, 32B and terminal strip 34 are not illustrated in the side view of FIG. 1B. Furthermore, electrical wiring between strain gauges 30A, 30B, 32A, 32B and terminal strip 34 is not illustrated in FIGS. 1A and 1B for purposes of clarity of illustration.

Figure 3:
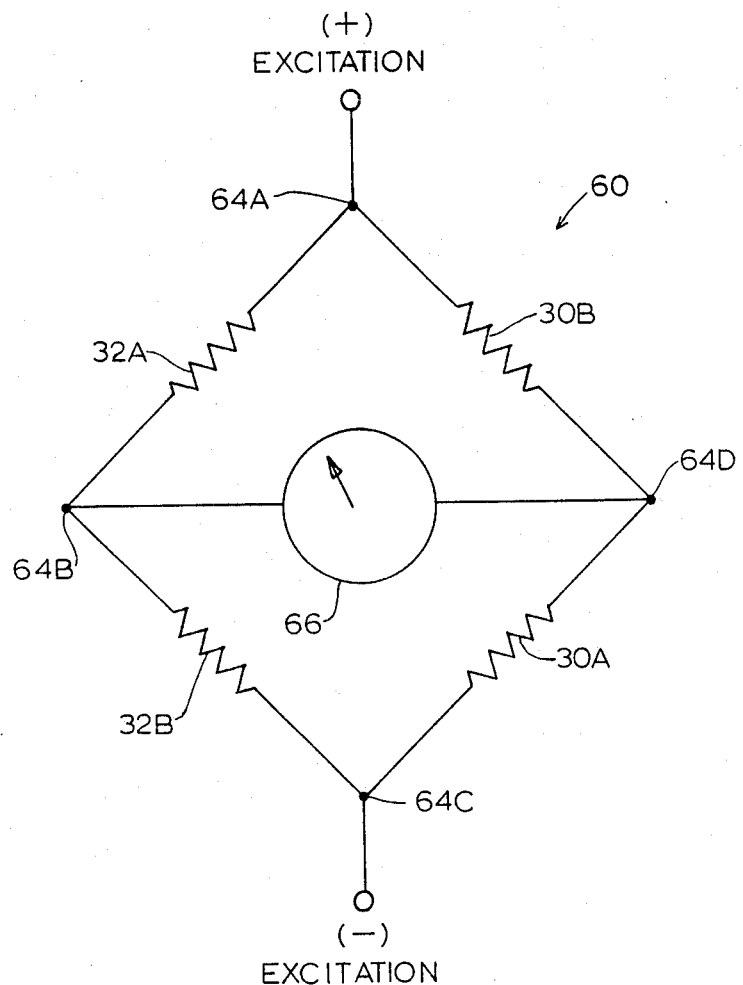
FIG. 3 is a schematic view of conventional strain gauges connected in a conventional Wheatstone Bridge configuration.

As illustrated in FIG. 3, strain gauges 30A, 30B, 32A and 32B are wired in a conventional Wheatstone Bridge configuration, indicated generally at 60. Bridge 60 is utilized with prior art plate 10 to transform deflections sensed by strain gauges 30A, 30B, 32A and 32B into usable data, e.g. weight measurements, in a well-known manner. Each leg between each pair of nodes 64A-64D of bridge 60 is electrically connected to include a strain gauge 30A, 30B, 32A or 32B. The voltage produced across nodes 64B and 64D produces a voltage reading at voltmeter 66 indicating the deflection in trumpet gauge plate 10 as sliver 22B passes through trumpet 20.

As explained above, a particular problem with a conventional plate 10, as illustrated in FIGS. 1A and 1B, is that external vibrations can result in erroneous weight measurments. Vibrations in a building, for example, can be transferred through base 28 and plate 10 to cause deflections which are sensed by strain gauges 30A, 30B, 32A and 32B.

A first preferred embodiment of an improved trumpet gauge plate, indicated generally at 40, is illustrated in FIGS. 4A and 4B. Plate 40 includes a lower portion 42 similar to lower portion 16 of plate 10. Lower portion 42 includes a central opening 43 for receiving a trumpet 20 in a manner similar to the assembly illustrated in FIG. 2.

Plate 40 includes an upper portion 44 and a central portion 45, each of which has a width approximately twice the width of lower portion 42. As illustrated best in FIG. 4B, central portion 45 has a cross section less than the cross sections of upper portions 44 and lower portion 42. Upper portion 44 includes mounting openings 46 for receiving fasteners in a manner similar to FIG. 2.

On both sides of lower portion 42, weighted elements 48A and 48B are mounted to central portion 45. Each weighted element 48A and 48B is formed to be operationally equivalent to substantially one-half of lower portion 42 and each weighted element 48A and 48B comprises one-half the weight of lower portion 42. As explained below, weighted elements 48A and 48B mounted on opposite sides of lower portion 42, act as vibration compensating elements that provide equal forces and displacements which are sensed by a plurality of strain gauges mounted on central portion 45. Each element 48A, 48B is able to vibrate independent of the vibration of lower portion 42.

Strain gauges 82A and 84A are mounted on the front surface 45A of central portion 45 above lower potion 42. Strain gauges 82B and 84B (not illustrated) are mounted at respective complementary positions on the rear surface 45B (not illustrated) of central portion 45 and above lower portion 42.

Strain gauge 86A is mounted on the front surface 45A of central portion 45 above weighted element 48A. Strain gauge 86B (not illustrated) is mounted at a complementary position on the rear surface 45B of the central portion 45 above weighted element 48A. Strain gauge 88A is mounted on the front surface 45A of the central portion 45 above weighted element 48B. Strain gauge 88B (not illustrated) is mounted at a complementary position on the rear surface 45B of the central portion 45 above weighted element 48B. Strain gauges 82A-88A, 82B-88B are very thin, planar members and for purposes of clarity of illustration, are not illustrated in the side view of FIG. 4B. It will be seen that strain gauges 86A, 86B and 88A, 88B detect vibration only.

Figure 5:
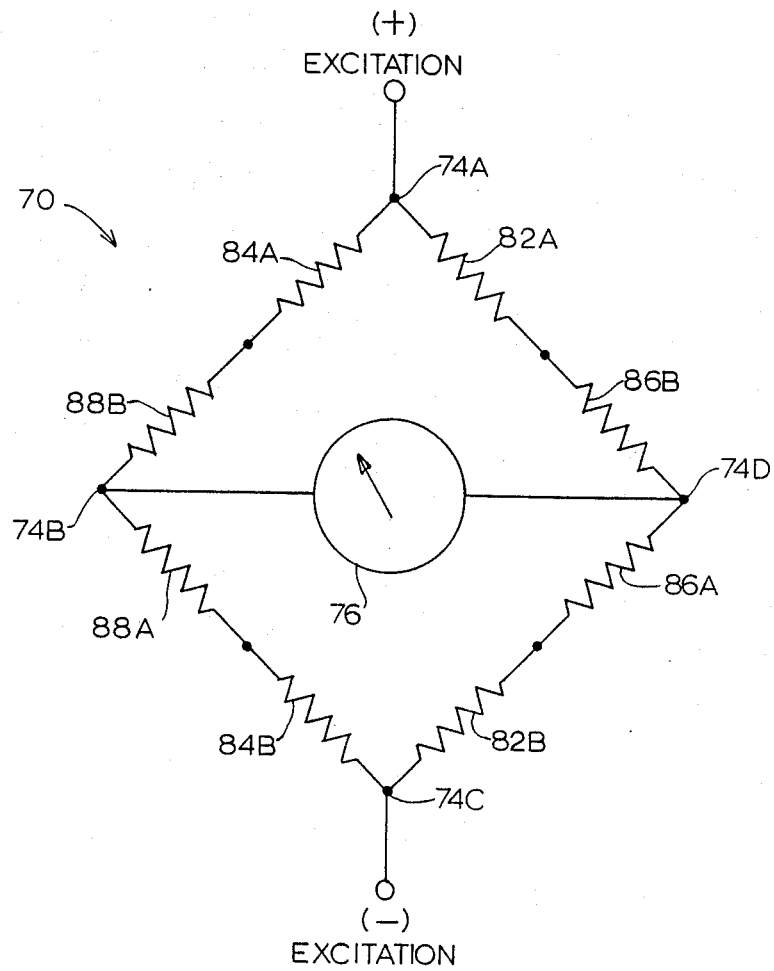
FIG. 5 is a schematic view of the strain gauges of the present invention connected in a modified Wheatstone Bridge configuration.

Strain gauges 82A-88A, 82B-88B are electrically connected by a conventional terminal strip (not illustrated) to form a modified Wheatstone Bridge, indicated generally at 70 and illustrated schematically in FIG. 5. Each leg of bridge 70 is electrically connected to include two strain gauges, one of which is mounted on the front or rear surface 45A or 45B above lower portion 42 and the other of which is mounted on the opposite rear or front surface 45B or 45A above one of the adjacent weighted elements 48A or 48B.

In the embodiment of bridge 70 illustrated in FIG. 5, strain gauge 82A, on front surface 45A above lower portion 42, and 86B, on back surface 45B above weighted element 48A, are electrically connected between nodes 74A and 74D. Strain gauge 86A, on front surface 45A above weighted element 48A, and 82B on rear surface 45B above lower portion 42, are electrically connected between nodes 74D and 74C. Strain gauge 84B, on rear surface 45B above lower portion 42, and 88A, on front surface 45A above weighted element 48B, are electrically connected between nodes 74C and 74B. Strain gauge 88B, on rear surface 45B above weighted element 48B, and 84A, on front surface 45A above lower portion 42, are electrically connected between nodes 74B and 74A.

The electrical polarity of each gauge in each pair of strain gauges in each leg of bridge 70 is arranged such that the voltages produced in the leg by vibration as the central portion 45 is deflected tend to cancel each other out. The remaining voltage in each leg is thus an accurate indication of the deflection of the central portion 45 due to trumpet deflection only.

It will be understood that a plurality of strain gauges mounted on the respective front surface 45A and rear surface 45B of the central portion 45 can be electrically connected in other configurations of the modified bridge 70 to provide accurate measurements. For example, strain gauge 84A and 86B could be electrically connected in the same leg and so forth, as long as a gauge on one surface 45A or 45B above lower portion 42 is matched with a gauge on the opposite surface 45B or 45A above one of the weighted elements 48A or 48B.

Figures 6A, 6B:
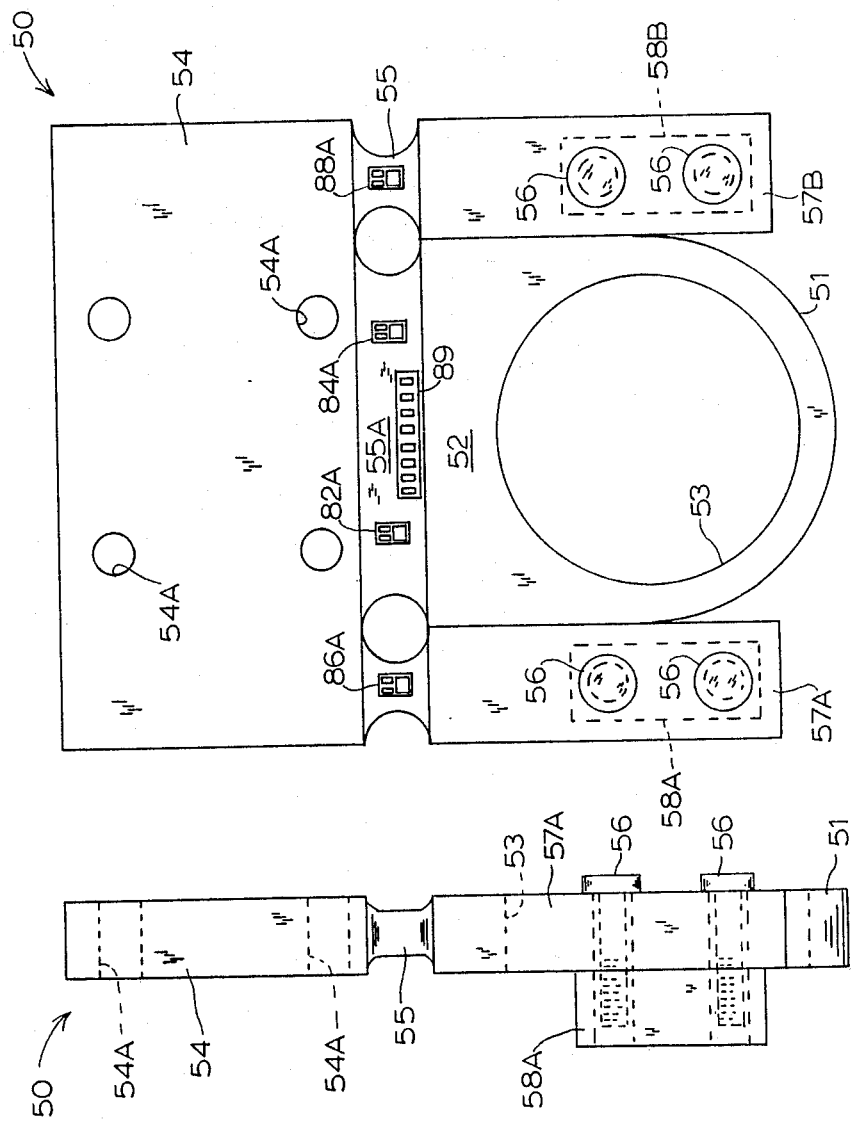
FIG. 6A is a side elevational view of a second embodiment of the trumpet gage plate of the present invention.
FIG. 6B is an end view of the apparatus of FIG. 6A.

A second preferred embodiment of an improved trumpet gauge plate, indicated generally at 50, is illustrated in FIGS. 6A and 6B. Plate 50 includes a lower portion 52 having a central opening 53 for receiving a trumpet 20 in a manner similar to FIG. 2. The lower surface 51 of lower portion 52 has a rounded configuration complementary to the radius of opening 53.

Plate 50 includes an upper portion 54 and a central portion 55, each of which has a width greater than the width of lower portion 52. Upper portion 54 includes mounting openings 54A. Central portion 55 has a cross section less than upper portion 54 and lower portion 52.

On both sides of lower portion 52, weighted elements 57A and 57B are mounted to central portion 52. For additional weight, blocks 58A and 58B can be secured to weighted elements 57A and 57B, respectively, in any conventional manner, e.g. by mechanical fasteners 56. Weighted elements 57A and 57B and blocks 58A and 58B act as vibration compensating elements that provide equal forces and displacements which are sensed by a plurality of strain gauges mounted on central portion 55. The vibration compensating means in whatever form is preferably constructed with respect to mass and stiffness so as to have essentially the same resonance frequency as that of the lower portion 42 and thereby provide substantially equal response to external vibration imposed on base 28. In a preferred form a pair of vibration compensating elements are provided on opposite sides of lower portion 42 with each such element having a resonance frequency substantially equal to that of lower portion 42.

As with central portion 45 of plate 40, strain gauges 82A-88A, 82B-88B (not illustrated) are mounted on the front surface 55A and rear surface 55B (not illustrated), respectively, of central portion 55. Strain gauges 82A-88A, 82B-88B are electrically connected to terminal strip 89 to form the modified Wheatstone bridge 70 illustrated in FIG. 5 as previously discussed.

Thus, external vibrations which resulted in erroneous readings for prior art trumpet gage plate 10, illustrated in FIGS. 1A and 1B, are cancelled out of measurements in the improved trumpet gage plates 40 and 50 described above. The unique arrangement of auxiliary strain gauges and auxiliary compensating elements thus provide a measurement wherein deflection sensings produced by external vibrations have been eliminated from the reading.

Although the present invention has been described with reference to preferred embodiments, workers skilled in the art will recognize that changes may be made in form and detail without departing from the spirit and scope of the invention.

What is claimed is:

1. An apparatus for measuring the unit weight of sliver as it passes through a trumpet, comprising:
   (a) an integral vertically positioned plate member having an upper portion secured to a base, a lower portion having a central opening for mounting a trumpet and a central portion of reduced cross-section joining said upper and lower portions;
   (b) a trumpet for passing sliver, said trumpet being mounted in said lower portion and operative to deflect said central portion when sliver is passed therethrough;
   (c) a pair of vertically positioned vibration compensating elements separately joined to said central portion and adapted to vibrate independent of said lower portion; and
   (d) detection and signaling means operative when sliver is passed through said trumpet and during vibration of said base to detect deflection in said central portion imposed by passing of sliver through said trumpet and by vibration of said lower portion and vibration compensating elements and to develop therefrom a measuring voltage substantially indicative of the deflection imposed on said trumpet in the absence of said vibration as an indication of said unit weight.

2. An apparatus for measuring the unit weight of sliver passed through a trumpet as claimed in claim 1 wherein said detection and signaling means comprise:
   (a) individual electrically resistive type strain gauges secured to said central portion at selected positions and operative to detect said deflections and generate changes in resistance in response thereto;
   (b) circuit means connecting said strain gauges in a Wheatstone bridge configuration in a manner such that the resistance changes attributable to detecting said vibrations tend to cancel out and said measuring voltage is obtained across a selected pair of nodes of said Wheatstone bridge to indicate said unit weight.

3. An apparatus for measuring the unit weight of sliver passed through a trumpet as claimed in claim 1 wherein said vibration compensating elements are formed so as to be substantially equivalent in form and weight to one vertical half of said lower portion.

4. An apparatus for measuring the unit weight of sliver passed through a trumpet as claimed in claim 1 wherein said vibration compensating elements are each equal in weight to substantially one-half the weight of said lower portion.

5. An apparatus for measuring the unit weight of sliver as it passes through a trumpet, comprising:
   (a) an integrll vertically positioned plate member having an upper portion secured to a base, a lower portion having a central opening for mounting a trumpet and a central portion of reduced cross-section joining said upper and lower portions;
   (b) a trumpet for passing sliver, said trumpet being mounted in said lower portion and operative to deflect said central portion when sliver is passed therethrough;
   (c) vertically positioned vibration compensating means joined to said central portion and adapted to vibrate independent of said lower portion, said vibration compensating means having a mass and stiffness providing a resonance frequency substantially equal to that of said lower portion and thus a substantially equal response to vibration of said base; and
   (d) detection and signaling means operative when sliver is passed through said trumpet and during vibration of said base to detect deflection in said central portion imposed by passing of sliver through said trumpet and by vibration of said lower portion and vibration compensating means and to develop therefrom a measuring voltage substantially indicative of the deflection imposed on said trumpet in the absence of said vibration as an indication of said unit weight.

6. An apparatus for measuring the unit weight of sliver as claimed in claim 5 wherein said vibration compensating means comprises a pair of compensating elements positioned on opposite sides of said lower portion with each of such elements having a mass and stiffness providing said resonance frequency substantially equal to that of said lower portion.

* * * * *